United States Patent
Gan et al.

(10) Patent No.: US 11,394,808 B2
(45) Date of Patent: Jul. 19, 2022

(54) PASSIVE IDENTIFICATION OF SERVICE PORTS IN CONTAINERS

(71) Applicant: KYNDRYL, INC., New York, NY (US)

(72) Inventors: Seng Chai Gan, Ashburn, VA (US); Shikhar Kwatra, Raleigh, NC (US); Michael Treadway, Keller, TX (US); John David Mandra, Weeki Wachee, FL (US)

(73) Assignee: KYNDRYL, INC., New York, NY (US)

( * ) Notice: Subject to any disclaimer, the term of this patent is extended or adjusted under 35 U.S.C. 154(b) by 40 days.

(21) Appl. No.: 16/983,019

(22) Filed: Aug. 3, 2020

(65) Prior Publication Data

US 2022/0038546 A1  Feb. 3, 2022

(51) Int. Cl.
*H04L 67/51* (2022.01)
*H04L 41/16* (2022.01)
(Continued)

(52) U.S. Cl.
CPC ............ *H04L 67/51* (2022.05); *G06K 9/6256* (2013.01); *G06N 3/02* (2013.01); *H04L 41/16* (2013.01);
(Continued)

(58) Field of Classification Search
CPC ....... G06F 9/45558; G06F 2009/45562; G06F 8/71; G06F 9/4881; G06F 9/5083; G06F 11/203; G06F 11/362; G06F 11/3644; G06F 2009/45595; G06F 21/602; G06F 3/0482; G06F 8/60; G06F 8/63; G06F 9/455; G06F 9/505; G06F 9/5072; G06F 9/547;
(Continued)

(56) References Cited

U.S. PATENT DOCUMENTS 6,286,047 B1  9/2001  Ramanathan et al.
7,543,052 B1  6/2009  Klein
(Continued)

FOREIGN PATENT DOCUMENTS

CN    102223398 A    10/2011

OTHER PUBLICATIONS

Zhuo et al., "Slim: OS Kernel Support for a Low-Overhead Container Overlay Network", Proceedings of the 16th USENIX Symposium on Networked Systems Design and Implementation (NSDI '19), Feb. 26-28, 2019, Boston, MA, 15 pages.
(Continued)

*Primary Examiner* — Djenane M Bayard
(74) *Attorney, Agent, or Firm* — Erik Swanson; Andrew M. Calderon; Roberts Calderon Safran & Cole P.C.

(57) ABSTRACT

A computer-implemented method to determine which port in a container is a service port. The method includes identifying, a first container, wherein the first container comprises a plurality of ports. The method further includes, training a neural network, wherein the neural network is configured to identify at least one service port from the plurality of ports. The method further includes, monitoring, by a network monitor, a set of data sent to the first container comprising a first parameter. The method includes, identifying a first service port of the plurality of ports. The method further includes, marking the first service port.

20 Claims, 6 Drawing Sheets

(51) Int. Cl.
*H04L 43/0811* (2022.01)
*G06N 3/02* (2006.01)
*H04L 43/16* (2022.01)
*G06K 9/62* (2022.01)

(52) U.S. Cl.
CPC .......... *H04L 43/0811* (2013.01); *H04L 43/16* (2013.01)

(58) Field of Classification Search
CPC ............ G06F 2009/4557; G06F 13/20; G06F 13/4282; G06F 2213/0026; G06F 2213/0042; G06F 9/5027; G06F 9/5077; G06F 11/079; G06F 11/142; G06F 11/3048; G06F 11/3072; G06F 11/3089; G06F 11/3447; G06F 11/3461; G06F 11/3495; G06F 11/3668; G06F 13/28; G06F 13/409; G06F 13/42; G06F 13/4221; G06F 13/4273; G06F 16/212; G06F 16/2228; G06F 16/23; G06F 16/2379; G06F 16/24564; G06F 16/24565; G06F 16/24568; G06F 16/252; G06F 16/583; G06F 16/903; G06F 16/951; G06F 16/958; G06F 2009/45579; G06F 2009/45587; H04L 41/16; H04L 41/145; H04L 67/10; H04L 67/02; H04L 67/1097; H04L 41/0893; H04L 65/1104; H04L 41/40; H04L 67/306; H04L 67/51; H04L 41/12; H04L 63/0823; H04L 63/1416; H04L 63/168; H04L 65/612; H04L 67/535; H04L 12/2861; H04L 51/046; H04L 63/10; H04L 63/1425; H04L 67/01; H04L 67/1095; H04L 67/125
See application file for complete search history.

(56) References Cited

U.S. PATENT DOCUMENTS

| | | | |
|---|---|---|---|
| 7,886,358 | B2 | 2/2011 | Copeland, III |
| 8,997,234 | B2 | 3/2015 | McClure et al. |
| 9,270,605 | B2 | 2/2016 | Izhak-Ratzin et al. |
| 9,450,838 | B2 | 9/2016 | Jain et al. |
| 9,706,414 | B2 | 7/2017 | Hu et al. |
| 9,998,371 | B2 | 6/2018 | Shen et al. |
| 10,050,853 | B2 | 8/2018 | Liu et al. |
| 10,298,670 | B2 | 5/2019 | Ben-Shaul et al. |
| 2002/0144156 | A1* | 10/2002 | Copeland ............ H04L 63/1408 726/22 |
| 2013/0097275 | A1 | 4/2013 | Wofford, IV et al. |
| 2015/0172157 | A1* | 6/2015 | Hu ...................... H04L 41/0823 370/253 |
| 2018/0144123 | A1 | 5/2018 | Levin et al. |
| 2018/0241775 | A1 | 8/2018 | Vera-Schockner |
| 2018/0331969 | A1 | 11/2018 | Chen et al. |
| 2019/0123934 | A1 | 4/2019 | Magganmane et al. |
| 2019/0286826 | A1 | 9/2019 | Bargury et al. |
| 2019/0386956 | A1 | 12/2019 | Lan et al. |
| 2020/0296136 | A1* | 9/2020 | Liu ...................... H04L 63/0209 |
| 2020/0342313 | A1* | 10/2020 | Huang ............... G06Q 30/0641 |

OTHER PUBLICATIONS

Yu et al., "FreeFlow: High Performance Container Networking", HotNets-XV, Nov. 9-10, 2016, Atlanta, GA, USA, 7 pages.
Collins et al., "Finding Peer-to-Peer File-Sharing Using Coarse Network Behaviors", ESORICS 2006, LNCS 4189, Copyright Springer-Verlag Berlin Heidelberg 2006, 17 pages.
En-Najjary et al., "Application-based Feature Selection for Internet Traffic Classification", 2010 22nd International Teletraffic Congress (ITC 22), Sep. 2010, 8 pages.
Mell et al., "The NIST Definition of Cloud Computing", Recommendations of the National Institute of Standards and Technology, Special Publication 800-145, Sep. 2011, 7 pages.

* cited by examiner

PASSIVE IDENTIFICATION OF SERVICE PORTS IN CONTAINERS

BACKGROUND

The present disclosure relates to containers, and, more specifically, to discovering the service port of a particular container.

Many modern computing applications are developed and deployed as containers. Containers are an executable unit of software in which application code is packed in a discrete unit. The container is created in a common manner, such that it can be operated anywhere, such as a local machine, or on a remote machine (e.g., cloud).

SUMMARY

Disclosed is a computer-implemented method to determine which port in a container is a service port. The method includes identifying a first container, wherein the first container comprises a plurality of ports. The method further includes training a neural network, wherein the neural network is configured to identify at least one service port from the plurality of ports. The method further includes monitoring, by a network monitor, a set of data sent to the first container comprising a first parameter. The method includes identifying a first service port of the plurality of ports. The method further includes marking the first service port.

Further aspects of the present disclosure are directed to systems and computer program products containing functionality consistent with the method described above.

The present Summary is not intended to illustrate each aspect of, every implementation of, and/or every embodiment of the present disclosure.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

Many modern computing applications are developed and deployed as containers. Several containers can be operated on almost any remote device.

In order to increase container security, monitoring, and deployment efficiency, embodiments of the present disclosure can identify the service ports of a container through passive monitoring of the containers data traffic.

The following acronyms may be used below:
API application program interface
ARM advanced RISC machine
CD-ROM compact disc ROM
CMS content management system
CoD capacity on demand
CPU central processing unit
CUoD capacity upgrade on demand
DPS data processing system
DVD digital versatile disk
EPROM erasable programmable read-only memory
FPGA field-programmable gate arrays
HA high availability
IaaS infrastructure as a service
I/O input/output
IPL initial program load
ISP Internet service provider
ISA instruction-set-architecture
LAN local-area network
LPAR logical partition
PaaS platform as a service
PDA personal digital assistant
PLA programmable logic arrays
RAM random access memory
RISC reduced instruction set computer
ROM read-only memory
SaaS software as a service
SLA service level agreement
SRAM static random-access memory
WAN wide-area network Cloud Computing in General It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
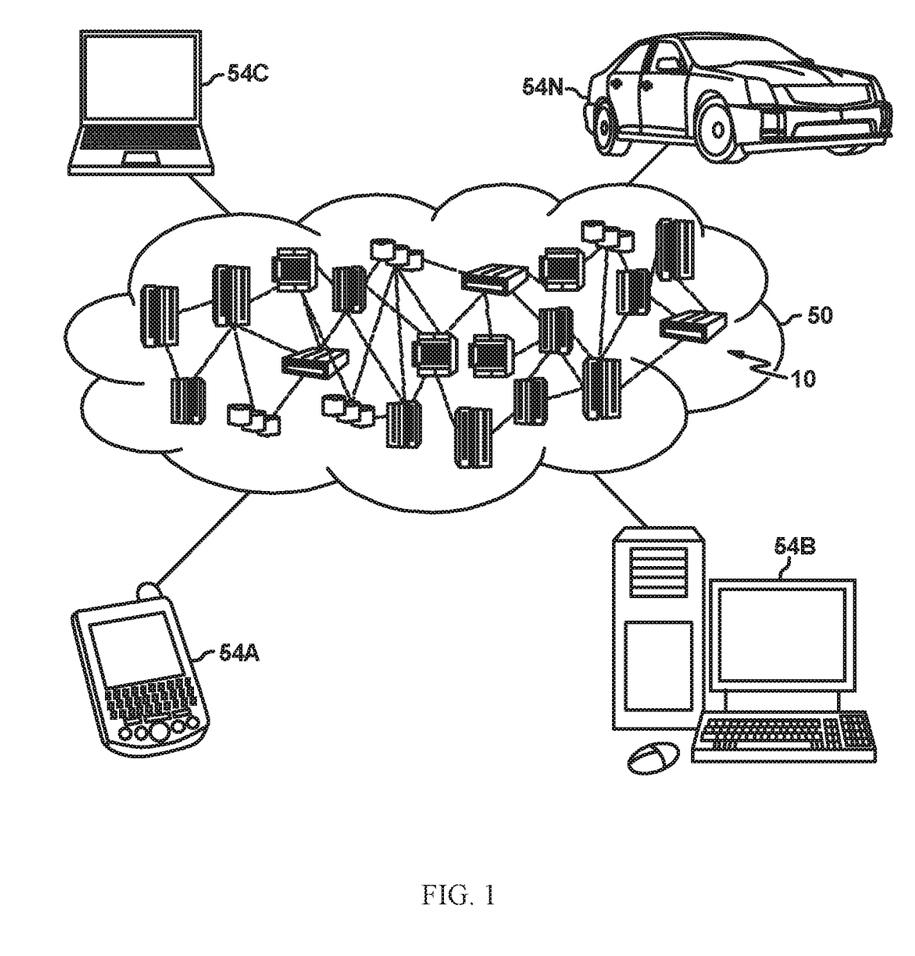
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
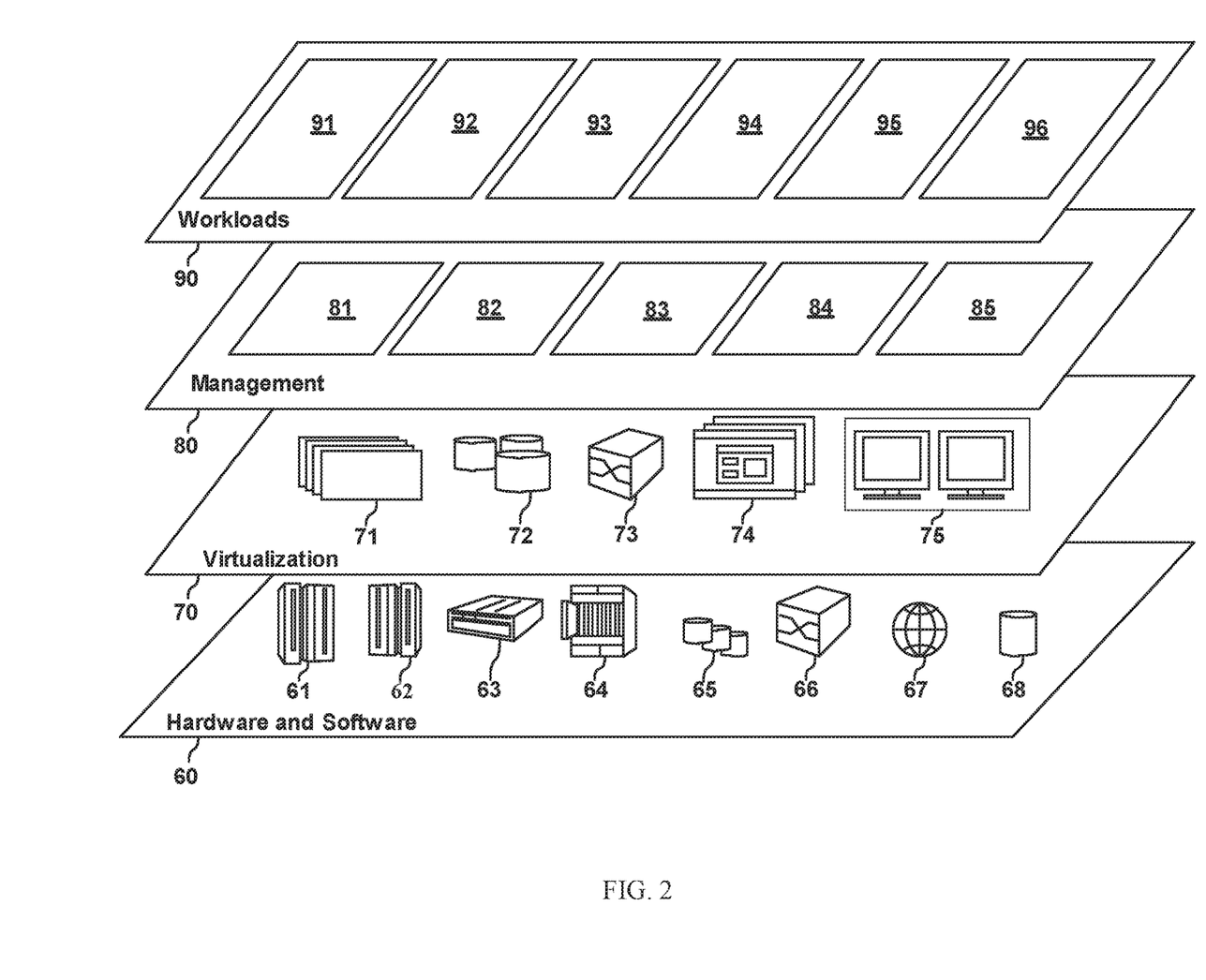
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and query grouping 96.

Data Processing System in General

Figure 3:
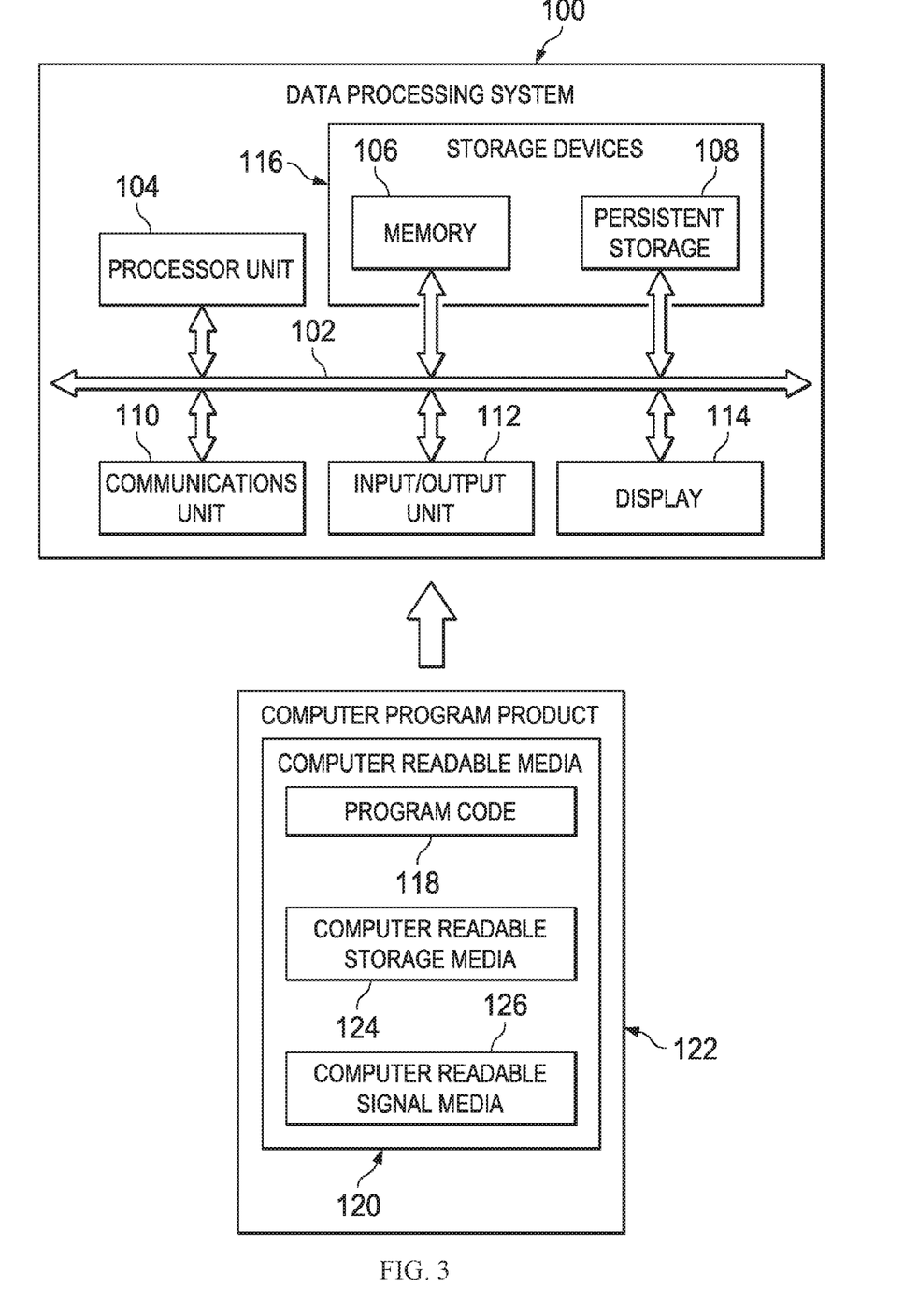
FIG. 3 is a block diagram of a data processing system (DPS) according to one or more embodiments disclosed herein.

FIG. 3 is a block diagram of an example DPS according to one or more embodiments. The DPS may be used as a cloud computing node 10. In this illustrative example, the DPS 100 may include communications bus 102, which may provide communications between a processor unit 104, a memory 106, persistent storage 108, a communications unit 110, an I/O unit 112, and a display 114.

The processor unit 104 serves to execute instructions for software that may be loaded into the memory 106. The processor unit 104 may be a number of processors, a multi-core processor, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random-access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/output unit 112 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code, computer usable program code, or computer readable program code that may be read and executed by a processor in the processor unit 104. The program code in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100. Other components shown in FIG. 1

Discovering/Identifying the Service Ports in a Container

Many modern computing applications are developed and deployed as containers. Containers are an executable unit of software in which application code is packed in a discrete unit. Containers are created in a common manner, such that they can be operated on a wide variety of computing devices, such as a local machine, or on a remote machine (e.g., cloud). Each container contains one or more ports to receive and send data. Each port can have a designated function. For example, there can be service ports where data is sent to be processed by the application, and an update port that is used to update the software.

In container-based computing environments, new application containers are created, deployed, and scaled based on a user's request/need and/or through an automated container orchestration system. Accurate monitoring of containers on a given infrastructure can increase the efficiency of the overall system by accurately allocating resources to needed containers. Additionally, ensuring the correct number of containers of a certain type (e.g., clones) are matching the demand for use also increases the efficiency of the computing environment. There is no standard method for obtaining data metrics associated with containers.

Additionally, a host (container host, owner of the computing resources) desire/require additional information about the container, such as which ports are service ports. The service port may provide the best data on efficient container management and monitoring. For example, if there are multiple clones of a container that are not fully utilized, one could be de-established and a different in high demand container established using those same resources.

Port identification can be accomplished by customizing the container. However, customization can increase the development cost and deployment if the container will be deployed to more than one environment. Another method for port identification is to allow physical access to the container. This involves data security risks. For example, if a container is related to bank information, the user of the container would not want any additional party to have access to the data accessed by or contained in the container.

Embodiments of the present disclosure include a method and system to identify the service port of a container. In some embodiments, the service port is identified by passively monitoring data traffic to and from the container. A network monitor can be used to count data packets, connection requests, packet size, and other similar data, that is directed to each port of a container.

In some embodiments, the data for many containers is collected and used to train a learning model. A learning model can include an Artificial Neural Network (ANN). In some embodiments, the learning model generates one or more thresholds that indicate when a port is a service port. The threshold can be based on one or more of the, packet size, the number of packets sent, and the number of connection requests to the port. In some embodiments, a port identifier identifies a container. The port identifier can determine a service port based on the thresholds and the data traffic to the identified port.

Embodiments of the present disclosure can increase security of containers. The service ports can be identified without allowing access to the data accessed by or contained in the container. Embodiments of the present disclosure allow for containers to be used across any number of computing environments, or, said differently, the container does not need to be customized for each computing environment to which it will be deployed. Embodiments may also allow computing environments that contain the disclosed port identified to accept and run a greater number of containers. In some embodiments, a container producer can develop a container with knowledge a container host cannot access contents of the container. This can increase the overall efficiency and productivity of the computing environment.

The aforementioned advantages are examples of advantages, and embodiments exist that can contain all, some, or none of the aforementioned advantages while remaining within the spirit and scope of the present disclosure.

Figure 4:
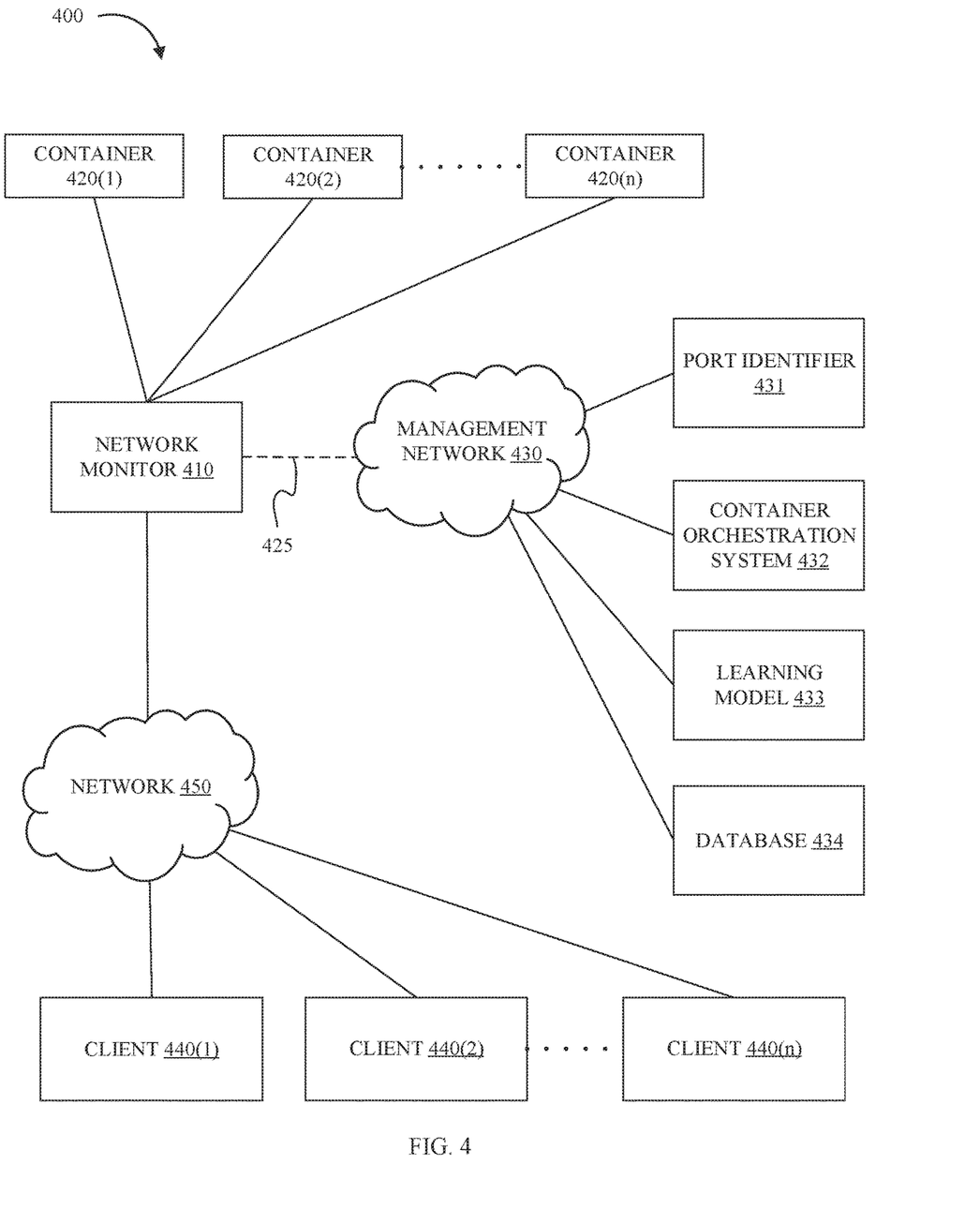
FIG. 4 illustrates a functional diagram of a computing environment suitable for operation of a service port identifier, in accordance with some embodiments of the present disclosure.

Referring now to various embodiments of the disclosure in more detail, FIG. 4 is a representation of a computing environment 400, that is capable of running a port identifier (e.g., port identifier 431) in accordance with one or more embodiments of the present disclosure. In some embodiments, computing environment 400 is included in cloud computing environment 50. Many modifications to the depicted environment may be made by those skilled in the art without departing from the scope of the disclosure. Computing environment 400 includes network monitor 410, containers 420, network traffic 425, management network 430, port identifier 431, container orchestration system 432, learning model 433, database 434, clients 440, and network 450.

Network 450 can be, for example, a telecommunications network, a local area network (LAN), a wide area network (WAN), such as the Internet, or a combination of the three, and can include wired, wireless, or fiber optic connections. Network 450 may include one or more wired and/or wireless networks that are capable of receiving and transmitting data, voice, and/or video signals, including multimedia signals that include voice, data, and video information. In general, network 450 may be any combination of connections and protocols that will support communications between network monitor 410, containers 420, management network 430, and other computing devices (not shown) within computing environment 400. In some embodiments, network monitor 410, client 440(1) through client 440(*n*), and database 430 may include a computer system, such as the data processing system 100 of FIG. 3.

Management network 430 can be a network consistent with network 450. In some embodiments, management network 430 is a separate network from network 450. In these embodiments, management network 430 includes port identifier 431, container orchestration system 432, learning model 433, database 434, and other computing devices (not shown). Management network 430 communicates with network 450 via network monitor 410 by network traffic 425. The separate networks allow the components in management network 430 to receive data from clients 440, via network monitor 410, while being transparent to clients 440. In some embodiments, network 450 and management network 430 are included in a single network.

Network monitor 410 monitors and collects network traffic relating to the operation of container 420. In some embodiments, network monitor 410 passively monitors a set of containers within a network, e.g., containers 420 in network 450. In an embodiment, network monitor 410 passively monitors the traffic for containers 420. The traffic includes communications between containers 420 and clients 440. In some embodiments, the monitoring includes recording the time of the communication and which containers are a part of the communication including a container identifier (container ID) for each contain, and a container type for each container. The monitoring may also include recording, for each container, the number of packets transferred, the number of connections established, the maximum packet size, container port data, and/or other similar data. In some embodiments, the data is monitored and stored based on the port to which the data is directed.

In some embodiments, network monitor 410 passes the data to management network 430 (or one or more of port identifier 431, container orchestration system 432, learning model 433, and database 434). The data can be used to establish and de-establish containers, train/update learning model 433, identify service ports, and other similar functions.

Container 420(1), container 420(2), through container 420(n), where n is an integer of any number, may be referenced to as containers 420 collectively or representatively. Containers 420 operate as packaged units of software for running an application that are managed by container orchestration system 432. Containers 420 may include containers from multiple customers (e.g., clients 440, or applications 441) of a cloud service provider. In an embodiment, containers 420 are deployed, monitored, cloned, and closed by container orchestration system 432 based on output received from network monitor 410 and/or clients 440. In an embodiment, containers 420 are running on hardware, i.e., servers, and/or VMs and can be moved by container orchestration system 432 between hardware and/or VMs.

Management traffic 425 is data transferred between management network 430 and network monitor 410. Management traffic can be inaccessible to clients 440. It can include data being transferred to and from port identifier 431, container orchestration system 432, learning model 433, and database 434. Management traffic 425 can be transferred by any communication protocol that allow data transfer between management network 430 and network monitor 410.

Port identifier 431 can be any combination of hardware and software configured to identify the service port(s) of containers 420. In some embodiments, port identifier 431 includes one or more of management network 430, container orchestration system 432, learning model 433, and database 434. However, each are shown as separate components for discussion purposes.

Container orchestration system 432 operates to manage the lifecycles of containers, (e.g., containers 420). In general, a container orchestration system controls and automates tasks including, but not limited to, provisioning and deployment of containers, redundancy and availability of containers, allocation of resources between containers, movement of containers across a host infrastructure, and load balancing between containers. In an embodiment, container orchestration system 432 is in communication with network monitor 410. In an embodiment, container orchestration system 432 allocates a container, generates a unique identifier (e.g., checksum/id), and provides the unique identifier and internet protocol (IP) address for the container to network monitor 410. In other embodiments, container orchestration system 432 may reside on another computing device (not shown), provided that container orchestration system 432 has access to network 450 and/or management network 430.

Learning model 433 can be any combination of hardware and/or software configured to identify service ports in a container. In some embodiments, learning model 433 is trained to identify a service port(s) of a container, or to identify if a port in a container is a service port.

In some embodiments, learning model 433 includes an artificial neural network (ANN). An ANN is a collection of nodes, where each node receives input, processes the received data, and passes on the results to an output or to additional nodes. In some embodiments, learning model 433 includes reinforcement learning. In general, reinforcement learning is an area of machine learning concerned with how one or more software agents ought to take actions in an environment so as to maximize some notion of cumulative reward. In an embodiment, learning model 433 passively monitors containers 420 by tracking a set of parameters of each container of containers 420. The parameters may include number of packets, number of connection requests, size of packets, contained identification data (e.g., container ID, etc.), and other similar data.

In some embodiments, learning model 433 analyses data (e.g., training data) to generate an initial model. The model may be updated based on subsequent results. In some embodiments, learning model 433 receives container data. This can be received from network monitor 410 and/or other components in computing environment 400. In some embodiments, learning model 433 generates a confidence score for each port in a container. In some embodiments, generating the confidence score include calculating the confidence score. The confidence score represents a likelihood that a port is a service port.

In some embodiments, learning model 433 generates/sets a service port threshold. The service port threshold can be a metric that indicates when a port will be considered a service port. The threshold may be based on one or more number of packets, number of connection requests, packet size, and other monitored data. For example, a threshold can be 100 packets per minute, so any port that receives greater than 100 packets per minute can be considered a service port.

In some embodiments, the one or more thresholds are based on analyzing data from known containers. The known container data may be stored in database 434. In some embodiments, the threshold may be updated. The update can be manual by a user. The update can be in response to feedback (e.g., user feedback). The update can be based on new data. In some embodiments, learning model 433 reevaluates (or reanalyzes) the data to adjust (if needed) the thresholds.

Database 434 operates as a repository for data received, used, and/or output by container orchestration system 432 and/or network monitor 410. Data received, used, and/or generated by container orchestration system 432 may include, but is not limited to, unique identifiers of containers, IP addresses of containers, container type, and service port identifiers. Data received, used, and/or generated by network monitor 410 may include, but is not limited to, a data packet transfer rate (e.g., transferred packets/unit of time) for each container, connection rate (e.g., connection request/unit of time), maximum packet size, and user/customer feedback. Database 434 can be implemented with any type of storage device capable of storing data and configuration files that can be accessed and utilized by the components in computing environment 400, such as a database server, a hard disk drive, or a flash memory. In an embodiment, database 434 is accessed by container orchestration system 432, port identifier 431, learning model 433, and/or network monitor 410 to store and/or to access the data.

In some embodiments, database 434 includes a rule repository. The rule repository can include rules to identify service ports in a container based on a container ID and/or a container type.

Client 440(1), client 440(2), through client 440(n), where n is an integer, may be referred to as clients 440 in combination or representatively. Clients 440 can be a standalone computing device, a management server, a web server, a mobile computing device, or any other electronic device or computing system capable of receiving, sending, and processing data. In other embodiments, client 440 can represent a server computing system utilizing multiple computers as a server system, such as in a cloud computing environment. In some embodiments, client 440 is configured to utilize one or more containers (e.g. containers 420) to complete a task. In some embodiments, client 440 send packets of data and/or connection request to container 420 via through network monitor 410.

Figure 5:
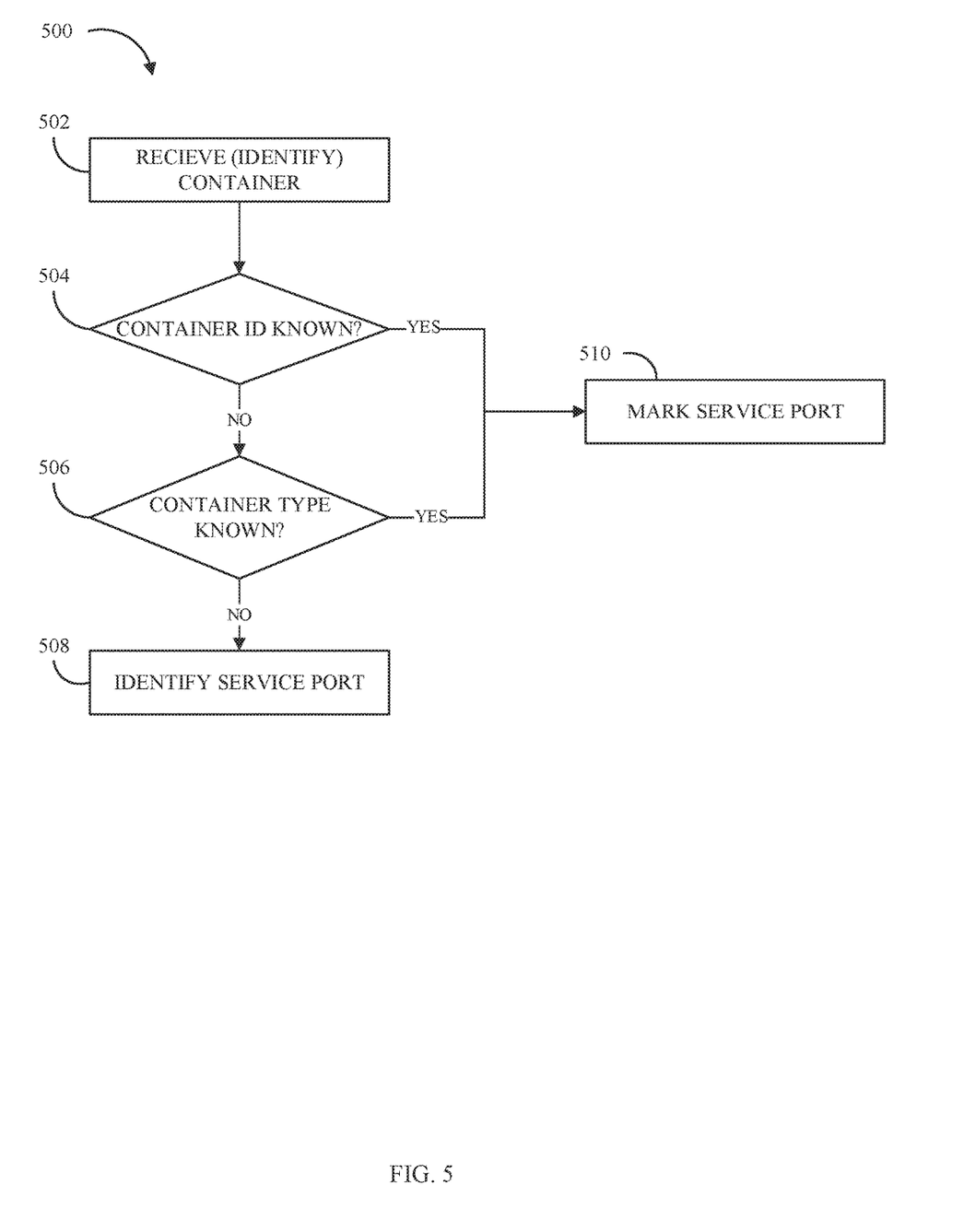
FIG. 5 illustrates a flow chart of an example method to identify service ports in a container, in accordance with some embodiments of the present disclosure.
Figure 6:
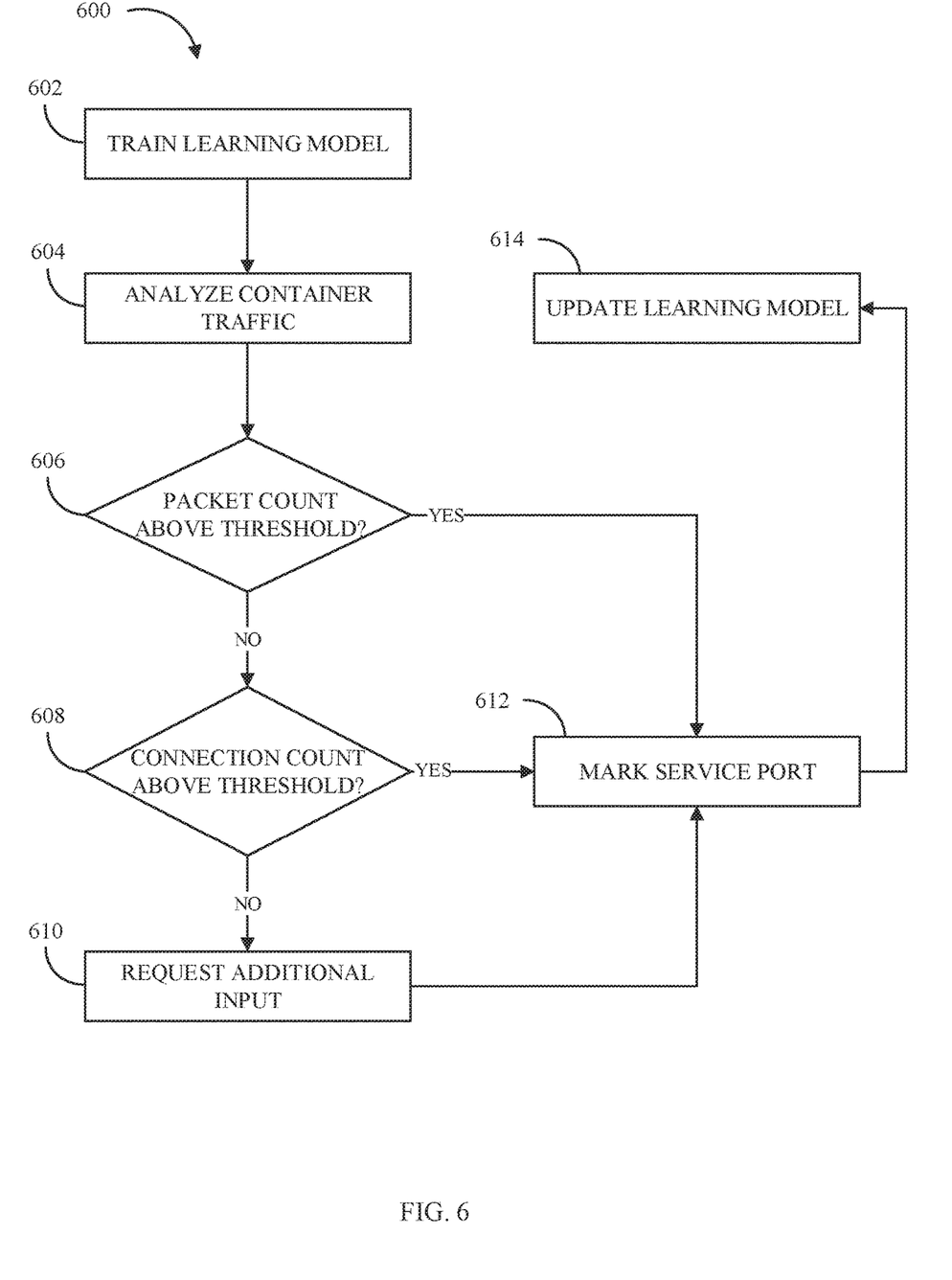
FIG. 6 illustrates a flow chart of an example method to identify service ports in a container, in accordance with some embodiments of the present disclosure.

Methods 500 and 600 can be implemented by one or more processors, port identifier 431, network monitor 410, the other components within computing environment 400, and/or a different combination of hardware and/or software. In various embodiments, the various operations of methods 500 and 600 are performed by one or more of network monitor 410, management network 430, port identifier 431, container orchestration system 432, learning model 433, database 434, and/or, the other components of computing environment 400. For illustrative purposes, the methods 500 and 600 will be described as being performed by port identifier 431.

FIG. 5 depicts a flowchart of an example method, method 500, to identify service ports in a container that can be performed in a computing environment (e.g., computing environment 400 and/or cloud computing environment 50). One or more of the advantages and improvements described above for identifying service ports by passive observation can be realized by method 500, consistent with various embodiments of the present disclosure.

At operation 502, port identifier 431 identifies a container. In some embodiments, identifying the container is in response to a container being established. The container may be established by container orchestration system 432 by a request from a client. In some embodiments, port identifier 431 cycles through all containers operating in computing environment 400.

In some embodiments, identifying the container includes obtaining container data. The data can be obtained by network monitor 410. The container data can include one or more of a container ID, a container type, a source, and other similar data. In some embodiments, obtaining container data includes tracking and/or storing data traffic related to the container. Traffic data can include the number of packets (both total packets, and packets to each port), connection request, packet sizes, and other similar data. This data can be sent to management network 430 to be analyzed and/or stored.

At operation 504, port identifier 431 determines if the container ID is known. In some embodiments, the container ID is known when an identical container (e.g., clone) has been previously or is currently deployed. The container IDs may be stored in database 434 once established. Additionally, relevant port data can be stored with the container ID, such that, when a container ID is known, the stored data is used to identify the service ports. In some embodiments, the container ID is known if the service ports are identified in the container data. In some embodiments, the container ID is known if there is a port selection rule associated with the container ID.

If the container ID is known (504: YES), then port identifier 431 proceeds to operation 510. If the container ID is not known (504: NO), then port identifier 431 proceeds to operation 506.

At operation 506, port identifier 431 determines if the container type is known. A container type may be based on one or more of source (e.g., client 440(1)), an application, and other similar factors. The container types may be stored in database 434. Additionally, relevant port data can be stored with the container type. Such that, when a container type is known, the stored data is used to identify the service ports. In some embodiments, the container type is known if the service ports are identified in the container data. In some embodiments, the container type is known if there is a port selection rule associated with the container type.

If the container type is known (506: YES), then port identifier 431 proceeds to operation 510. If the container type is not known (506: NO), then port identifier 431 proceeds to operation 508.

At operation 508, port identifier 431 identifies (determines) the services ports. In some embodiments, the service ports are identified by monitoring and/or analyzing data transfer to and from the container. In some embodiments, the service ports are identified by learning model 433. Identifying the service ports is explained in further detail in method 600 of FIG. 6.

At operation 510, port identifier 431 marks the service port(s). In some embodiments, marking the service ports includes storing container data in database 434. In some embodiments, marking the service port includes monitoring and storing data traffic through the service port.

In some embodiments, operation 510 includes re-deploying one or more containers based on the service ports. Re-deploying can include cloning a container, removing clones of a container, moving containers to different physical machines, altering priorities, and other similar tasks. In some embodiments, the re-deploying (or optimizing) is performed by container orchestration system 432. The re-deploying can be configured to increase the efficiency of the computing environment (e.g., computing environment 400).

FIG. 6 depicts a flowchart of an example method, method 600, to identify service ports in a container that can be performed in a computing environment (e.g., computing environment 400 and/or cloud computing environment 50). One or more of the advantages and improvements described above for identifying service ports by passive observation can be realized by method 600, consistent with various embodiments of the present disclosure.

At operation 602, port identifier 431 trains a learning model. In some embodiments, training includes setting one or more service port thresholds. The learning model can include a neural network. The value of the threshold can be based on an analysis of container data for current and previously established containers. In some embodiments, the threshold is based on the number of data packets received. In some embodiments, the threshold is based on connection requests. In some embodiments, the learning model establishes (or determines) more than one threshold. For example, a first threshold can be based on a data packet transfer rate and a second threshold based on connection request rate. Additionally, the threshold may be based on multiple factors. For example, a threshold may include both connection requests and the data packet transfer rate. The threshold can be normalized over a standard period of time (e.g., packets per minute, etc.). In some embodiments, the threshold is based on container characteristics. Some characteristics may include source, customer, priority, container size, and other similar factors.

In some embodiments, the learning model is trained to generate a confidence score for each port. The confidence score may represent the likelihood a port is a service port. In some embodiments the confidence score is based on one or more of data packet transfers, connection requests, packet size, and other similar data.

At operation 604, port identifier 431 analyzes port data traffic. In some embodiments, analyzing includes collecting container data such as a data packet transfer rate, packet size, and connection request rate. The data may be collected by network monitor 410. Each packet intended for the container will be sent to a specific port on that container. The data is gathered for each individual port. In some embodiments, operation 604 includes monitoring, by a network monitor, a set of data sent to the first container to determine a first parameter set.

In some embodiments, the data is analyzed by learning model 433. Analyzing the data can include applying the data against the learning model. In some embodiments, operation 604 determines a packet count, a packet measurement period (e.g., a predetermined amount of time), a connection count, and a connection count period for each port. The packet measurement period can be the same or different than the connection count period.

At operation 606, port identifier 431 determines if the packet count for any port is above a data packet transfer rate threshold. In some embodiments, port identifier 431 compares the packet rate for each port against the threshold. If the packet count rate for one or more ports exceeds the threshold (606: YES), then port identifier 431 proceeds to operation 612. If the packet count rate for one or more ports does not exceed the threshold (606: NO), then port identifier 431 proceeds to operation 608.

At operation 608, port identifier 431 determines if the connection count for any port is above a connection rate threshold. In some embodiments, port identifier 431 compares the connection rate for each port against the threshold. If the connection rate for one or more ports exceeds the threshold (608: YES), then port identifier 431 proceeds to operation 612. If the connection count rate for one or more ports does not exceed the threshold (608: NO), then port identifier 431 proceeds to operation 610.

At operation 610, port identifier 431 request additional input. In some embodiments, the request is directed to a user. The user may be the source of the container, a human, and/or a computing device. The additional input can be used to identify the service ports and/or update the learning model.

At operation 612, port identifier 431 marks the service port. In some embodiments, operation 612 can be consistent with operation 510 of FIG. 5.

At operation 614, port identifier 431 updates the learning model. In some embodiments, the learning model is updated with the data collected in operation 604 and/or 502. In some embodiments, updating the learning model can result in a change to the thresholds.

The methods 500 and 600 can identify the service ports of an unknown container by passive monitoring. This can reduce the amount of time required for development and deployment of containers.

Computer Technology and Computer Readable Media

The present disclosure may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising using a processor for:
   training a neural network to identify a container service port from a plurality of container ports;
   identifying a first container that comprises a first plurality of ports;
   monitoring, by a network monitor, a set of data sent to the first container to determine a first parameter set;
   identifying a first service port of the first plurality of ports using the neural network; and
   marking the first service port.

2. The method of claim 1, wherein:
   the neural network is further configured to set a first threshold; and
   the identifying of the first service port is in response to the first parameter exceeding the first threshold.

3. The method of claim 2, wherein the first parameter set includes a data packet transfer rate.

4. The method of claim 2, wherein the first parameter set includes a connection request rate.

5. The method of claim 2, wherein the first parameter set includes a maximum packet size.

6. The method of claim 1 further comprising:
   analyzing, by the neural network, the set of data for each of the first plurality of ports; and
   generating a confidence score for each of the first plurality of ports, wherein the confidence score represents a likelihood each of the first plurality of ports is a service port.

7. The method of claim 6, further comprising:
   determining, in response to calculating the confidence score for each of the first plurality of ports, that each confidence score is below a threshold confidence score;
   receiving an input, wherein the input indicates the first service port; and
   updating, based on the input, the neural network, wherein the identifying of the first service port is in response to updating the neural network.

8. The method of claim 1, further comprising:
   identifying a second container, including a second container identifier and a second container type;
   determining a rule repository includes a second rule for the second container identifier; and
   identifying, in response to determining the rule repository includes the second rule for the second container identifier, a second service port in the second container.

9. The method of claim 8, further comprising:
   identifying, for the first container, a first container identifier and a first container type;
   determining the rule repository does not include a first rule for the first container identifier and the first container type; and
   wherein:
   the identifying of the first service port of the first plurality of ports is in response to determining the rule repository does not include the first rule for the first container identifier and for the first container type.

10. The method of claim 1, wherein a container host cannot access contents of the first container.

11. A system comprising:
   a processor; and
   a computer-readable storage medium communicatively coupled to the processor and storing program instructions which, when executed by the processor, are configured to cause the processor to:
   train a neural network to identify a container service port from a plurality of container ports;
   identify a first container that comprises a first plurality of ports;
   monitor, by a network monitor, a set of data sent to the first container to determine a first parameter set;
   identify a first service port of the first plurality of ports using the neural network; and
   mark the first service port.

12. The system of claim 11, wherein:
   the neural network is further configured to set a first threshold; and
   the identification of the first service port is in response to the first parameter exceeding the first threshold.

13. The system of claim 12, wherein the first parameter set includes a data packet transfer rate.

14. The system of claim 12, wherein the first parameter set includes a connection request rate.

15. The system of claim 12, wherein the first parameter set includes a maximum packet size.

16. A computer program product, the computer program product comprising a computer readable storage medium having program instructions embodied therewith, the program instructions executable by a processing unit to cause the processing unit to:
- train a neural network to identify a container service port from a plurality of container ports;
- identify a first container that comprises a first plurality of ports;
- monitor, by a network monitor, a set of data sent to the first container to determine a first parameter set;
- identify a first service port of the first plurality of ports using the neural network; and
- mark the first service port.

17. The computer program product of claim 16, wherein:
- the neural network is further configured to set a first threshold; and
- the identification of the first service port is in response to the first parameter exceeding the first threshold.

18. The computer program product of claim 17, wherein the first parameter set includes a data packet transfer rate.

19. The computer program product of claim 17, wherein the first parameter set includes a connection request rate.

20. The computer program product of claim 16, wherein the first parameter set includes a maximum packet size.

* * * * *